United States Patent

[11] 3,630,167

| [72] | Inventors | Edward G. Schultz, Jr.<br>Richmond, Ind.;<br>Paul F. Metz, Fairfield, Ohio |
|---|---|---|
| [21] | Appl. No. | 25,062 |
| [22] | Filed | Apr. 2, 1970 |
| [45] | Patented | Dec. 28, 1971 |
| [73] | Assignee | The United States of America as represented by the United States Air Force |

[54] DIFFERENTIAL PRESSURE INDICATOR WITH LIGHT GUIDES
2 Claims, 3 Drawing Figs.

[52] U.S. Cl. ..................................................... 116/70,
73/419, 116/114 R
[51] Int. Cl. ....................................................... G01l 19/12,
G01l 13/02
[50] Field of Search ........................................... 73/418,
301, 407 R, 410, 412; 116/70; 340/380, 244 A;
350/273

[56] References Cited
UNITED STATES PATENTS
3,119,270  1/1964  Wayne ........................ 73/410

2,715,339  8/1955  Honig ............................ 73/410 X
3,523,456  8/1970  Matzen et al. ................. 73/313
3,205,710  9/1965  Maniya et al. ................. 73/410

Primary Examiner—Louis R. Prince
Assistant Examiner—Daniel M. Yasich
Attorneys—Harry A. Herbert, Jr. and Richard J. Killoren ABSTRACT: A differential pressure-sensing device positioned in an interior wall between two chambers and having two light guides leading from the pressure-sensing device through an external wall of one of the chambers. A shutter pin in the pressure-sensing device has one end attached to a bellows communicating with one of the chambers with the pressure in the other chamber acting against the end of the shutter pin. The shutter pin is movable across a light path between the two light guides so that light directed through one guide at the external wall can be seen through the other light guide when the desired differential pressure is maintained and light is blocked when the pressure difference is not at the desired level.

PATENTED DEC 28 1971 3,630,167

INVENTORS
EDWARD G. SCHULTZ, JR.
PAUL F. METZ
BY Harry A. Herbert Jr.
ATTORNEY
Richard J. Killoren
AGENT

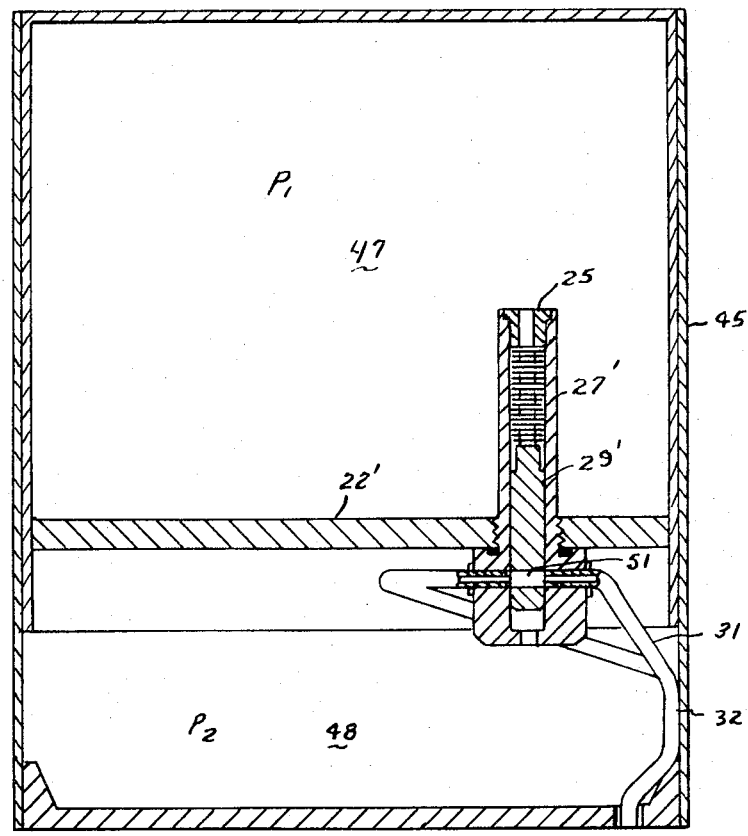

DIFFERENTIAL PRESSURE INDICATOR WITH LIGHT GUIDES

BACKGROUND OF THE INVENTION

In some weapons, such as some canister bombs, a vacuum is required in the payload section of the weapon. To improve quality control it is desirable to check for vacuum in the stockpiled weapons. While many systems are available for indicating pressure or vacuum within a chamber, these would be very costly to adapt for use in these systems wherein the wall between the chambers is inaccessible. Some low-cost means is therefore required to indicate when a desired pressure difference is maintained between two chambers wherein the wall separating them is inaccessible.

SUMMARY OF THE INVENTION

According to this invention a differential sensing device is located in the wall between two chambers which are to be maintained at different vacuum or pressure levels. A shutter pin attached to a bellows closes off the light path between two light guides when the pressure difference is not at the proper level. A light directed through one light guide will appear at the output of the other light guide when the pressure difference is at the proper level.

IN THE DRAWING

FIG. 3 is a sectional view of a two chamber device with a modified pressure-sensing device.

DETAILED DESCRIPTION OF THE INVENTION

Figure 1:
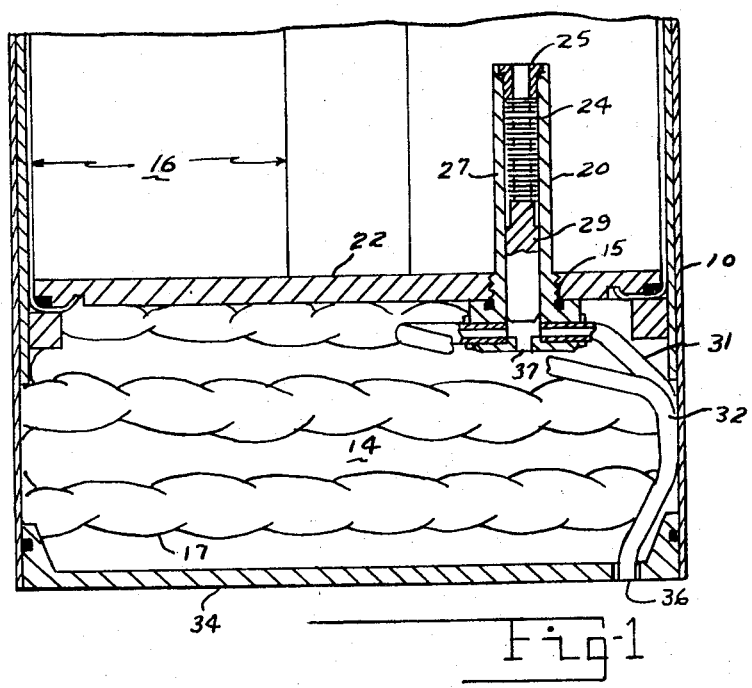
FIG. 1 is a partially schematic sectional view of a weapon having two chambers which are to be maintained at different pressure levels.

Referring now to FIG. 1 of the drawing, reference numeral 10 refers to a weapon having a first chamber 16 and a second chamber 14. Space for a payload is shown schematically at 16 as an annular chamber. Apparatus such as a drag device 17 are positioned in chamber 14. In such a weapon system, it is desirable to maintain a vacuum in chamber 16. A pressure-sensing device 20 is positioned in the wall 22 between chambers 16 and 14 and is hermetically sealed by means of O-ring seal 15. The pressure-sensing device 20 has a spring-type bellows 24 secured to an orifice plug 25 that is hermetically sealed with an epoxy into the sensor housing 27. The bellows 24 is also hermetically sealed to the plug 25 by any well-known means such as an epoxy.

A shutter pin 29 is secured to the opposite end of bellows 24 by any well-known means, such as solder or epoxy and hermetically seals the other end of the bellows. Light guides 31 and 32 each have one end extending into the housing 27 in diametrically opposed positions to provide a straight line path for light through housing 27 when shutter pin 29 is in the retracted position, as shown in FIG. 1. The opposite ends 35 and 36 of light guides 31 and 32 extend through chamber wall 34. Any well-known light guides may be used. One type of light guide used was the light guide made by DuPont under the trade name Crofon Light Guide. An aperture 37 is provided in the housing 27 to permit the pressure in chamber 14 to act against shutter pin 29.

In the operation of the device, with the vacuum maintained in chamber 16, the pressure in chamber 14 causes the pin 29 to remain in the retracted position shown. If the vacuum is lost in chamber 16 the increase in pressure in chamber 16 acts within the bellow 24 to move the pin 29 into the space between light guides 31 and 32. When checking the weapon, a light is directed into one of the light guides such as light guide 31. If light passes through housing 27 and out the other light guide 32, so that it can be seen at end 36, it indicates that pin 29 is retracted and that a vacuum exists in chamber 16. If no light is seen at 36 it indicates that pin 29 has moved into the light between light guides 31 and 32 and the desired vacuum does exist in chamber 16.

While the device thus far described relates to a weapon, wherein a vacuum is desired, there are other possible uses to the device, for example, oil pressure indicators, temperature indicators, permanent tire gages, and altimeters for aircraft.

Figure 2:
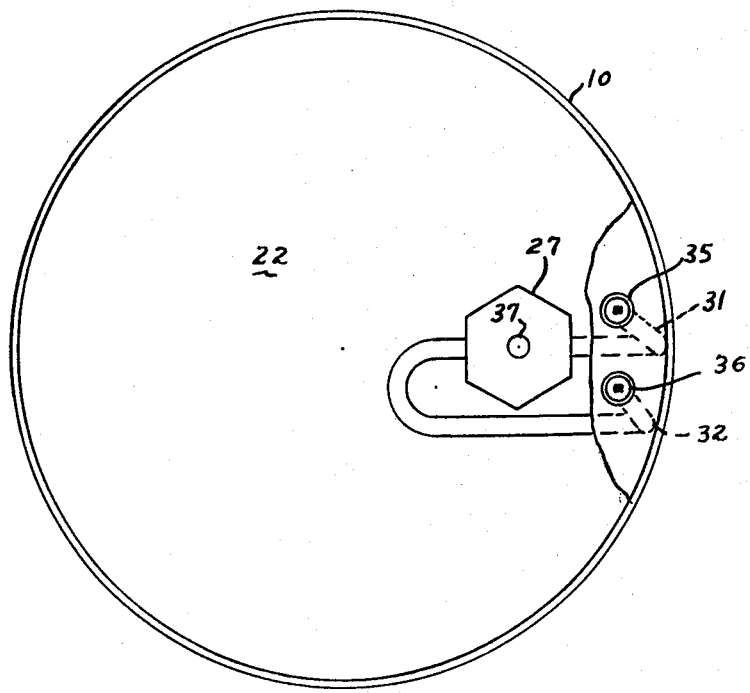
FIG. 2 is a partially cutaway bottom view of the device of FIG. 1.

Also the device, with minor modification, could be used to indicate changes of pressure level in either of two chambers as in the device of FIG. 3 which shows a device 45 having two pressure chambers 47 and 48 at pressure levels $P_1$ and $P_2$, respectively. The pressure sensor 27' is the same as pressure sensor 27 in FIGS. 1 and 2 except that the shutter pin 29' has an aperture 51. Thus movement of pin 29' in either direction will block the light path between light guides 31 and 32. Stops, now shown, may be provided to limit the travel of pin 29'. Also, a much longer aperture, than shown, may be provided with filters of different colors in different portions of the aperture to indicate the direction of movement of pin 29'.

There is thus provided a low-cost differential sensing device for indicating changes in pressure difference between two chambers wherein the wall between the chambers is inaccessible.

I claim:

1. A device for indicating when the difference in pressure in two adjacent chambers, having a common wall, has changed from the predetermined desired level, comprising: sensor housing hermetically sealed in said common wall; said sensor housing having a channel therethrough; a spring bellows being hermetically sealed at one end and having its open end hermetically sealed in one end of said channel; a shutter pin positioned within said channel and secured to the sealed end of said bellows; whereby a change in differential pressure within said chambers, changes the position of the shutter pin within said channel; a first light guide means, connected to one side of the sensor housing and extending from the sensor housing through an external wall of said chambers, for permitting light to be directed from the external wall through the sensor housing; a second light guide means, connected to the other side of the sensor housing directly opposite and in line with the first light guide, for permitting visual determination of the position of the pin within said channel whereby a change from the desired predetermined pressure difference will be indicated by the shutter pin blocking the light path between the first and second light guide means; said first and said second light guide means being bent to extend through the same external wall of said chamber, whereby a change in the pressure difference may be readily detected by directing a light into the end of one light guide means and by viewing the end of the second light guide means.

2. A device as recited in claim 1 wherein said shutter pin has an aperture therethrough whereby the alignment of said aperture with said light guide means indicates that the desired predetermined pressure difference is maintained in said chambers.

* * * * *